Aug. 26, 1958    MASUO HOSOKAWA ET AL    2,849,355
METHOD FOR PREPARING DI-ACETONE-L-SORBOSE
Filed June 12, 1953
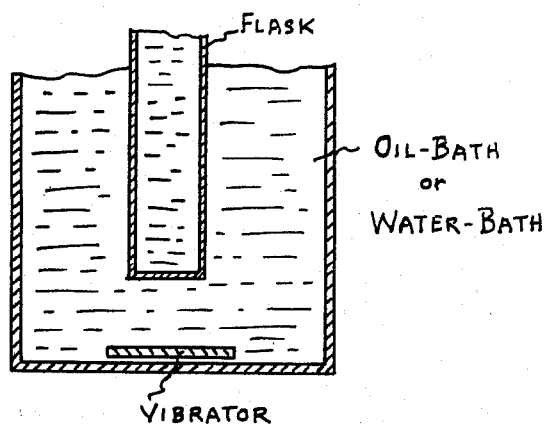
INVENTORS:
MASUO HOSOKAWA,
HIROSHI YAGI and
KENJI NAITO
By Wenderoth, Lind &
Ponack
ATTORNEYS

United States Patent Office 2,849,355
Patented Aug. 26, 1958

2,849,355

METHOD FOR PREPARING DI-ACETONE-L-SORBOSE

Masuo Hosokawa, Toyonaka, Osaka, Hiroshi Yagi, Sumiyoshi-ku, Osaka, and Kenji Naito, Shimogyo-ku, Kyoto, Japan, assignors to Takeda Pharmaceutical Industries, Ltd., Osaka, Japan Application June 12, 1953, Serial No. 361,418

Claims priority, application Japan June 28, 1952

3 Claims. (Cl. 204—154)

This invention relates to an improved method for manufacturing diacetone-L-sorbose, an important intermediate for the synthesis of vitamin C. Diacetone-L-sorbose has so far been manufactured by condensing L-sorbose with acetone. However, this reaction generally takes as long as ca. 20 hours, which is a shortcoming for mass-production of di-acetone-L-sorbose.

The present inventors have engaged in research to overcome the said shortcoming and found that super-sonic waves accelerate the reaction remarkably.

The present invention was made on the basis of these findings and relates to a method for manufacturing di-acetone-L-sorbose, which is characterized by condensing L-sorbose or mono-acetone-L-sorbose with acetone under irradiation with super-sonic waves.

Di-acetone-L-sorbose is thought to be produced from L-sorbose through a mono-acetone-L-sorbose. In the process of this invention mono-acetone-L-sorbose as well as L-sorbose is converted profitably into di-acetone-L-sorbose.

Needless to say, this reaction is a condensation reaction by dehydration. Therefore, the traditional dehydrating agents used for this purpose and other substances having similar activity also may be used in the process of the present invention. For example, this reaction is carried out in the presence of sulfuric acid, anhydrous hydrogen chloride, anhydrous copper sulfate, anhydrous aluminum chloride, anhydrous zinc chloride, anhydrous phosphoric acid or other dehydrating agents which do not hamper the reaction.

In its nature, this reaction is slightly exothermic. This evolution of heat is increased by the irradiation with super-sonic waves, so the reaction in the process of the present invention is conducted profitably with proper cooling.

According to the method of the present invention, the time hitherto required is shortened to one twentieth. For instance, when conducted at 21° C., the reaction is completed in ca. one hour, and at 30° C. in ca. 30 minutes. The change of the cycle of super-sonic waves has no great influence on the yield, so any suitable cycle may be used according to the invention.

The isolation of the product is effected by neutralizing the reaction mixture, distilling off the solvent and recrystallizing the residue from a suitable solvent or by other traditional methods with no reduction in yield as hitherto obtained.

As mentioned above the present invention is useful to obtain the product in a short time and, therefore, very important for mass production of di-acetone-L-sorbose, particularly, for its production by a continuous procedure.

The following examples set forth embodiments of the present invention, the apparatus described in the said examples being shown, in diagrammatic form, on the accompanying figure of drawing. The bath may be an oil-bath or a water-bath, as specified in the respective examples. The vibrator is per se conventional and may be of the rock-crystal resonator type or of the magnetostriction resonator type, as specified in the respective examples.

Example 1

Two hundred cc. of anhydrous acetone, 10 g. of L-sorbose and 1 cc. of pure sulfuric acid are placed in a flask. The lower part of the flask is immersed in an oil-bath, and a rock-crystal resonator (vibrator) facing to the bottom of the flask is provided in the oil. The reaction is carried out at ca. 20° C. for an hour under irradiation with super-sonic waves (500 kc., generated by charging the vibrator with high-frequency current of 180 w.). The reaction mixture is neutralized with sodium hydroxide solution, and the acetone is distilled off under reduced pressure. The remaining aqueous solution is extracted with benzene, and the extract is dried over anhydrous sodium sulfate and evaporated. The residue is subjected to fractionating distillation, and ca. 10 g. of di-acetone-L-sorbose distilling over at 140° C. under 0.5 mm. pressure is collected.

Example 2

Five kilograms of L-sorbose, 100 liters of anhydrous acetone and 350 grams of anhydrous phosphoric acid are place in a reaction tube, and the lower part of the tube is immersed in a water-bath. The reaction is conducted at ca 20° C. for an hour under irradiation with super-sonic waves (30 kc., generated by charging a magnetostriction resonator (vibrator) provided in the water to face to the bottom of the tube with high-frequency current of 600 w.). The reaction mixture is worked up as in Example 1. The yield is ca. 4.9 kg.

Example 3

Five kilograms of L-sorbose, 70 liters of anhydrous acetone and 5 kilograms of anhydrous zinc chloride are placed in a reaction tube, and the lower part of the tube is immersed in a water-bath. The reaction is conducted at ca. 30° C. for 30 minutes under irradiation with super-sonic waves (27 kc., generated by charging a magnetostriction resonator (vibrator) provided in the water to face to the bottom of the tube with high-frequency current of 600 w.). The reaction mixture is worked up as in Example 1. The yield is ca. 5.2 kg.

Example 4

Ten g. of L-sorbose and 200 cc. of anhydrous acetone are subjected to a reaction with varying dehydrating agents, electric power to be charged on the vibrator, temperature and time. The results are as follows:

| Dehydrating agent | | Kilocycles of supersonic wave | Power charged on vibrator (w.) | Temperature (° C.) | Time (min.) | Yield (g.) |
|---|---|---|---|---|---|---|
| Anhydrous zinc chloride. | 10 g. | 14 | 1,500 | 5 | 70 | 9.1 |
| Pure sulfuric acid. | 1.5 cc. | | | | | |
| Anhydrous zinc chloride. | 10 g. | 14 | 1,000 | 10 | 60 | 10.4 |
| Pure sulfuric acid. | 1.5 cc. | | | | | |
| Anhydrous zinc chloride. | 10 g. | 14 | 310 | 15 | 40 | 11.0 |
| Pure sulfuric acid. | 1.5 cc. | | | | | |
| Anhydrous zinc chloride. | 10 g. | 14 | 420 | 27 | 50 | 10.8 |
| Pure sulfuric acid. | 1.5 cc. | | | | | |
| Anhydrous zinc chloride. | 10 g. | 14 | 600 | 20 | 20 | 10.1 |
| Dry hydrogen chloride. | 0.5 g. | | | | | |

Example 5

14.6 g. of mono-acetone-L-sorbose, 200 cc. of anhydrous acetone and 1 cc. of pure sulfuric acid are placed in a flask, and the lower part of the flask is immersed in an oil-bath. The reaction is carried out at ca. 25° C. for 10 minutes under irradiation with supper-sonic waves (450 kc., generated by charging a rock crystal resonator (vibrator) provided in the oil to face to the bottom of the flask with high-frequency current of 180 w.).

What is claimed is:

1. A method for preparing di-acetone-L-sorbose which comprises reacting a member selected from the group consisting of L-sorbose and mono-acetone-L-sorbose with acetone at a temperature not exceeding 40° C. in the presence of a dehydrating agent under irradiation with super-sonic waves having a frequency exceeding about 14 kc. for a time not exceeding about 70 minutes, and thereafter recovering di-acetone-L-sorbose from the reaction mixture.

2. A method for preparing di-acetone-L-sorbose which comprises reacting a member selected from the group consisting of L-sorbose and mono-acetone-L-sorbose with acetone at a temperature not exceeding 40° C. in the presence of a dehydrating agent selected from the group consisting of sulfuric acid, anhydrous hydrogen chloride, anhydrous copper sulfate, anhydrous aluminium chloride, anhydrous zinc chloride and anhydrous phosphoric acid, under irradiation with super-sonic waves having a frequency exceeding about 14 kc. for a time not exceeding about 70 minutes, and thereafter recovering di-acetone-L-sorbose from the reaction mixture.

3. A method for preparing di-acetone-L-sorbose which comprises reacting a member selected from the group consisting of L-sorbose and mono-acetone-L-sorbose with acetone at a temperature not exceeding 40° C. in the presence of a dehydrating agent selected from the group consisting of sulfuric acid, anhydrous hydrogen chloride, anhydrous copper sulfate, anhydrous aluminium chloride, anhydrous zinc chloride and anhydrous phosphoric acid, under irradiation with super-sonic waves having a frequency exceeding about 14 kc. for a time not exceeding about 70 minuts, while moderating the reaction mixture by heat exchange with a cooling medium, and thereafter recovering di-acetone-L-sorbose from the reaction mixture.

References Cited in the file of this patent

UNITED STATES PATENTS

| | | |
|---|---|---|
| 2,301,811 | Reichstein | Nov. 10, 1942 |
| 2,437,852 | Groff et al. | Mar. 16, 1948 |

FOREIGN PATENTS

| | | |
|---|---|---|
| 868,437 | France | Sept. 29, 1941 |

OTHER REFERENCES

Transactions—Institution of Chemical Eengineers, vol. 15 (1937), pages 223–232 (an article by Freundlich).

Tech. Mitt. Krupp Forschungsberichte, January 1940, 3, pages 12–25 (an article by Demann et al.).

Chemical Abstracts 36 (1942), columns 3007 and 3008 (abstracts of articles entitled "Development of a method giving diacetonesorbose in maximum yield" and "Problems of technique in acetonating sorbose").

Manufacturing Chemist and Manufacturing Perfumer, November 1948, vol. 19, pp. 505, 506.

Chemical Abstracts 42 (1948), column 871 (abstract of article entitled "Ascorbic acid, its preparation and properties").

Chemical and Enginnering News, volume 33, No. 4, January 24, 1955, pages 316, 319.